Dec. 22, 1970 M. C. BOHN ET AL 3,548,481
METHOD OF REBUILDING WORN TEETH OF GEARS, SPLINES, SPROCKETS
AND THE LIKE
Filed July 18, 1968

INVENTORS
MARTIN C. BOHN
JOHN F. BRADY
KENNETH G. RICE
JOHN O. SPINELLO

Merriam, Marshall, Shapiro & Klose
ATTYS.

United States Patent Office 3,548,481
Patented Dec. 22, 1970

3,548,481
METHOD OF REBUILDING WORN TEETH OF GEARS, SPLINES, SPROCKETS AND THE LIKE
Martin C. Bohn, Highland Park, John F. Brady, Wood Dale, Kenneth G. Rice, Evergreen Park, and John O. Spinello, Blackhawk Heights, Ill., assignors to Chicago Clutch Manufacturing Co., Inc., Chicago, Ill., a corporation of Illinois
Filed July 18, 1968, Ser. No. 745,752
Int. Cl. B22d 19/10
U.S. Cl. 29—401                        7 Claims

ABSTRACT OF THE DISCLOSURE

A method of rebuilding worn teeth on toothed members such as gears, splined shafts, sprockets, etc., by building up the clearance side of the teeth, and grinding the wear out of the worn side and the built up portion on the clearance side. The grinding operation is continued until the characteristics of the original teeth are obtained, that is, the same tooth thickness, shape, etc., as the original teeth. Building up of the clearance side can be accomplished by welding or bonding a suitable thin metal strip or shim onto the clearance side of the tooth.

---

This invention relates to a method of rebuilding worn teeth on toothed members such as gears, splined shafts, sprockets and the like, and in particular to a method of rebuilding such worn teeth so that the wear sides of the rebuilt teeth are exactly the same in construction and characteristics as the original wear sides of the original teeth.

On most types of toothed members such as gears, splined shafts, sprockets, etc. as utilized in vehicles such as trucks, earth moving equipment, etc., there is a driving side of the teeth which becomes worn during use and a clearance side which is not worn. During manufacturing, the orignal teeth of such toothed members are hardened by well known methods in order that the driving or wear side of the teeth can withstand the constant abrasiveness to which they are subjected in normal use. Eventually the wear sides of the teeth become so worn that the toothed member must be replaced or repaired.

It has become the rule rather than the exception in the industry to replace worn toothed members with new parts rather than attempt repairing or rebuilding the same. Due to the high cost of new parts, various attempts have been made to rebuild the worn teeth, none of which have met with any degree of success. Prior attempts have concentrated on welding or bonding another strip of material to the wear side and grinding this side until the desired tooth size is obtained. However, by this method the wear side is formed of a composite of two different materials and is not as strong or durable as the original tooth. Practical experience has shown that in almost all cases a worn member is simply replaced with a new part, rather than attempting to rebuild the worn teeth.

In accordance with the principles of the present invention, there is provided a method of rebuilding the worn teeth of such toothed members, wherein the wear sides of the rebuilt teeth are basically the same structure and exhibit the same characteristics as the same side of the original teeth. In particular, in accordance with the principle of the invention to be hereinafter described, the worn teeth are rebuilt by initially biulding up the clearance side such as by welding or bonding a metal strip to the clearance side, grinding the wear out of the worn side of the teeth, and grinding the built up portion on the clearance side of the teeth. Grinding of the teeth sides can be done simultaneously in one operation, or as two separate operations. Thus, in this novel method the composite structure has been placed on the clearance side of each tooth where there is no driving contact and therefore no wear or abuse. Furthermore, the wear side of each tooth is still formed of the original hardness and is a single piece surface.

The invention will be better understood from the following detailed description thereof taken in conjunction with the accompanying drawing in which.

Figure 2:
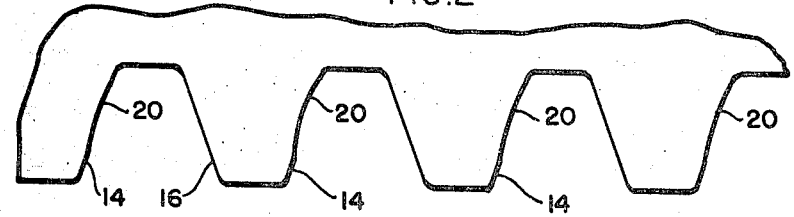
FIG. 2 is a sectional view greatly magnified so as to illustrate the wear in one side of the teeth.
Figure 3:
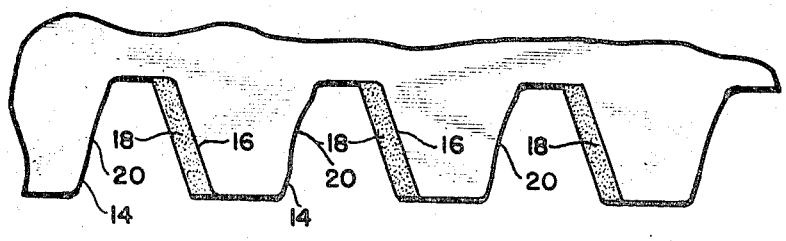
Figure 4:
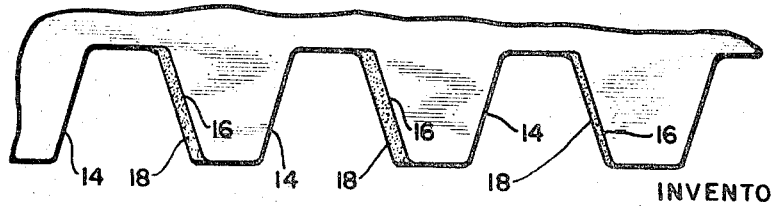

FIG. 3 is a sectional view similar to FIG. 2, illustrating the teeth in the rebuilding process with a shim strip applied to the clearance side of the teeth; and FIG. 4 is a similar view of the enlarged teeth shown in FIG. 2 after the wear has been grinded out of the wear side and the built up portion on the clearance side has been ground down to provide the same tooth characteristics as the original teeth.

Figure 1:
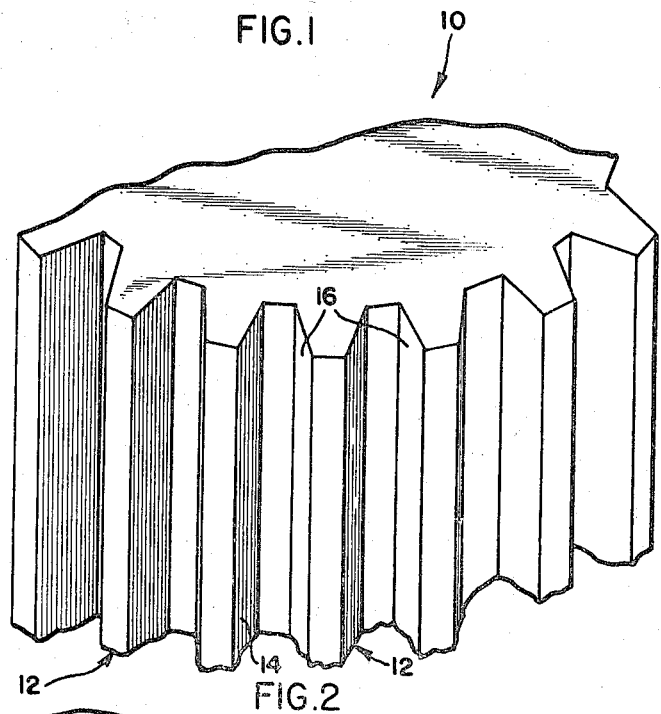
FIG. 1 is a fragmentary view of a portion of a toothed member.

Referring now to FIG. 1 there is illustrated a portion of a toothed member 10, such as a gear, splined shaft, sprocket or the like, which includes the teeth 12 each having a wear side 14 which is subjected to wear during normal use of the toothed member 10, and a clearance side 16 which is normally not subjected to any measurable degree of wear during normal use.

Referring to FIG. 2 there is illustrated the worn teeth 12 in which due to normal use of the member 10, about 20–25 thousandths of an inch has been worn into the wear side 14. This is shown as the wear portion 20. The actual amount of wear will, of course, vary with the type of toothed member and its actual operating usage. Also, the indicated amount of wear given above is merely an example, and can be indicative of a significant amount of wear with some toothed members and an insignificant amount of wear with others. FIG. 2 illustrates the clearance side 16 which does not show any appreciable amount of wear during normal usage. Under normal operations, the teeth condition such as shown in FIG. 2, would require replacement of the member 10 to prevent further damage to the connecting equipment.

Instead of replacing the toothed member with a new part, which becomes quite costly for large parts such as truck gears, etc., this invention is directed to a method for rebuilding the worn teeth. After the worn teeth have been degreased by normal degreasing methods to remove all grease etc., a hard metal shim or strip 18 is welded or bonded using standard techniques onto the clearance side 16 of each tooth 12. On some of the teeth 12 the wear portion 20 is abnormally deep, such as shown in the middle tooth of FIGS. 2 and 3. The size of the shims is determined by the amount of build-up required for the most severely worn tooth. Thus, if the wear side 14 of the most severely worn tooth is only worn a small amount, only a very thin shim need be placed on each of the clearance sides 16; whereas for an abnormally large wearing portion 20a such as shown in the middle tooth of FIG. 3, the clearance sides 16 of each tooth should be built up a correspondingly large amount and a somewhat larger shim 18 is therefore required. Normally, the same size shim must be affixed to each of the teeth to insure the same amount of radial displacement for each tooth and thereby prevent undesired binding of the rebuilt teeth. However, in some instances, such as where the required shim size is only a very small percentage of the clearance between teeth, then the shims do not all have to be the same size. In fact, in these instances only the most badly worn teeth need be shimmed, since the minute differences in radial displacement of each tooth would not adversely affect their use.

After welding or bonding the same size shim 18 to the clearance side 16 of each of the teeth 12, the wear portion 20 is grinded out of the wear side 14 so as to make the surface of the wear side 14 resemble as close as possible the same surface as the original tooth. Similarly, the shim or metal strip 18 on the clearance side 16 is ground until the original tooth characteristics such as shape and thickness, etc. are obtained. While the two sides of the tooth may be grinded in two separate operations, it is preferred, in order to obtain the exact tooth characteristics as the original teeth, to simultaneously grind down the wear side 14 of one tooth and the shim 18 opposite thereto on the clearance side of the adjacent tooth. By simultaneously grinding down the wear side and the built-up portion of the clearance side, the exact tooth characteristics can be more precisely obtained. The teeth of the rebuilt member 10 have therefore merely been radially displaced the same angle from their original positions. The grinding process can be accomplished in accordance with standard industrial apparatus and techniques.

FIG. 4 illustrates the teeth after the above described grinding process is completed. Note that the wear side 14 is again a smooth surface as in the original toothed member, and that the original teeth characteristics have been obtained. Furthermore, note that the metal strip 18 has been placed on the clearance side which is not subjected to any substantial degree of wear. Therefore, the critical wear side 14 has been restored to its original shape and for all purposes is exactly the same as in the original member.

In the event that during the grinding operation on the wear side 14 to remove the worn portion 20, grinding must be carried below the hardness level of the wear side, the final rebuilt teeth must again be rehardened. Under normal usage, there is a sufficient thickness of material hardness so that grinding the wear out of the worn side will not go beyond the hardness level. However, if this happens then the teeth can be rehardened. For appearance and to somewhat increase the hardness, the tooth surfaces can the be treated with glass beading in accordance with well known techniques.

It is to be realized that the above described invention should also enable one to replace a broken portion of a tooth such as occurs occasionally in such badly worn members. Since the toothed member rebuilt in accordance with the above described invention is more reliable in use than previously rebuilt parts, it should be possible to replace the original broken portion with more reliability than heretofore possible. It is to be understood that the above described method can be used with any type of toothed member, such as gears, splined shafts, sprockets, etc. which incorporates a wear side and a clearance side.

The foregoing detailed description has been given for clearness of understanding only, and no unnecessary limitations should be understood therefrom, as modifications will be obvious to those skilled in the art.

We claim:
1. The method of rebuilding worn teeth on toothed members such as gears, splined shafts, sprockets, and the like which incorporate a wear side and a clearance side, the method comprising:
   building up said clearance side on at least the most badly worn of said teeth; and
   grinding the wear side and the built up portion on said clearance side to provide tooth characteristics substantially equal to the original tooth characteristics.
2. The method of claim 1, wherein said building up of said clearance side comprises welding a metal strip thereto.
3. The method of claim 1, wherein said building up of said clearance side comprises bonding a metal strip thereto.
4. The method of claim 1, wherein said building up of said clearance side comprises securing a metal strip to said clearance side.
5. The method of claim 1, wherein the grinding of said wear side and of clearance side is provided by separate grinding operations.
6. The method of claim 1, including hardening of said toothed member after the grinding operation.
7. The method of rebuilding worn teeth on toothed members such as gears, splined shafts, sprockets, and the like which incorporate a wear side and a clearance side, the method comprising:
   providing a plurality of metal shim strips, one for each of said teeth;
   securing one of said metal shim strips to the clearance side of each of said teeth to build up said clearance sides; and
   simultaneously grinding the wear side and the built-up portion of said clearance side on each of said teeth to provide a rebuilt tooth member having tooth characteristics substantially equal to the original tooth characteristics.

References Cited

UNITED STATES PATENTS 612,840   10/1898   Gleason.

FOREIGN PATENTS 14,637   2/1900   Great Britain.

OTHER REFERENCES

July-August 1945, Welding Arcs distributed by General Electric, p. 10.

JOHN F. CAMPBELL, Primary Examiner

D. C. REILEY, Assistant Examiner

U.S. Cl. X.R.

29—527.6; 264—36